United States Patent
Bultema

[15] 3,656,309
[45] Apr. 18, 1972

[54] PIPE LAYING METHOD AND APPARATUS

[72] Inventor: John H. Bultema, 625 Seminole Road, Muskegon, Mich. 49444

[22] Filed: Aug. 28, 1970

[21] Appl. No.: 67,707

[52] U.S. Cl. ................................61/72.1, 61/43, 61/72.3
[51] Int. Cl. ..............................................E01g 3/10
[58] Field of Search................61/72.1, 72.3, 50, 52, 46, 61/43, 66, 65; 114/54; 52/745, 293

[56] References Cited

UNITED STATES PATENTS 3,036,438  5/1962  Sims ..........................................61/82

1,293,900  2/1919  Pendergast ..............................114/54

FOREIGN PATENTS OR APPLICATIONS 1,136,178  12/1968  Great Britain ............................61/50
1,525,198  4/1968  France ....................................52/169

*Primary Examiner*—Jacob Shapiro
*Attorney*—Price, Heneveld, Huizenga & Cooper

[57] ABSTRACT

This disclosure relates to a method and apparatus for laying subaqueous pipelines to a specified line and grade by means of inflatable bags which are positioned beneath an end of each pipe section as it is laid in place. The fluid pressure in the inflatable bags is adjusted, preferably by inflating the bags, in order to position each pipe section at a predetermined grade.

13 Claims, 5 Drawing Figures

INVENTOR
JOHN H. BULTEMA

BY
ATTORNEYS

INVENTOR
JOHN H. BULTEMA

BY Price, Heneveld
Huizenga & Cooper

ATTORNEYS

PIPE LAYING METHOD AND APPARATUS

BACKGROUND OF THE INVENTION

This invention relates to a method and apparatus for laying a pipeline to a specified line and grade. In one of its aspects, the invention relates to a method and system for laying a subaqueous pipeline with the aid of inflatable bags on one end of each pipe section.

Subaqueous pipelines are used to carry cooling water between power plants, for example, and deeper portions of an aqueous body such as a lake. These pipelines are laid to a specified line and grade along the bottom of the body of water. The pipelines are often of large diameter and each pipe section can weigh thousands of pounds.

Many methods and devices have been devised for laying subaqueous pipelines. The difficulty with these pipelines results from the fact that the large heavy pipe sections must be precisely positioned to a specified line and grade far beneath the surface of the water.

In a conventional method of laying such pipeline, each pipe section is positioned in proper alignment by supporting the pipe section from a crane on a floating barge. Once the pipe section has been placed on the proper line, it is necessary to adjust the heighth of the free end of the pipe section until the proper grade is attained. A grade rod is supported on top of the free end of the pipe section, extending above the water level. The end of the pipe section is raised by the crane until the proper grade is sighted on the grade rod.

Quite frequently, the pipe and/or the barge moves during this alignment procedure before backfill material can be placed beneath the pipe, resulting in movement of the pipe out of proper alignment. The alignment process must then be commenced once again. Numerous other procedures for laying subaqueous pipelines are discussed in Robley, U.S. Pat. No. 3,267,682. The particular apparatus disclosed by Robley is a structural frame which supports two sections of pipe. The framework contains various controls for moving the pipe to a designated position. The entire structure is lowered into the bottom of the lake and the pipe is aligned by moving various of the apparatus components. After each set of pipe sections are set in place, the entire structure must be raised onto the barge to receive another set of pipe sections. This apparatus is quite expensive and the procedure is quite complicated and impractical for large diameter pipe.

By various aspects of this invention, one or more of the following, or other, objects can be obtained.

SUMMARY OF THE INVENTION

It is an object of this invention to provide an improved method and system for laying a pipeline, especially subaqueous pipelines, to a specified line and grade.

It is another object of this invention to provide a quick and accurate method of laying a subaqueous pipeline wherein each pipe section can be quickly and surely brought to a specified grade without danger of shifting of the pipe section due to movement of the barge prior to backfilling, or settlement of the temporary support such as sand bags, timbers or concrete pads.

It is yet another object of this invention to provide an inexpensive and simple system for laying a plurality of subaqueous pipe sections to form a subaqueous pipeline quickly and accurately to a specified line and grade.

Other aspects, objects, and the several advantages of this invention are apparent to one skilled in the art from a study of this disclosure, the drawings, and the appended claims.

According to one embodiment of the invention, there is provided a method for laying a pipeline along a predetermined axis. Each pipe section is positioned in the course for the pipeline with an inflatable bag coupled with the pipe section beneath one end thereof. The fluid pressure in the inflatable bag is adjusted until the one end is aligned with the predetermined axis. Successive pipe sections are laid seriatim by positioning each pipe section with one end in registry with the free end of each previous pipe section and aligning the other end of each of the successive pipe sections in the manner described for the first pipe section.

Further, according to the invention, there is provided a system for laying a subaqueous pipeline. Means are provided for supporting pipe sections above a body of water and for lowering each pipe section into the water in a preselected position on the bottom of the aqueous body. Inflatable bags are fixed beneath one end portion of each pipe section. A fluid pressure line has means for releasably coupling the inflatable bags with the pipe section support means above the level of water. Fluid pressure adjusting means are coupled to the fluid pressure line to adjust the fluid pressure in the inflatable bags so as to raise or lower one end of the pipe section on the bottom of the aqueous body.

The invention will now be described with reference to the accompanying drawings.

DESCRIPTION OF THE PREFERRED EMBODIMENTS

Figure 1:
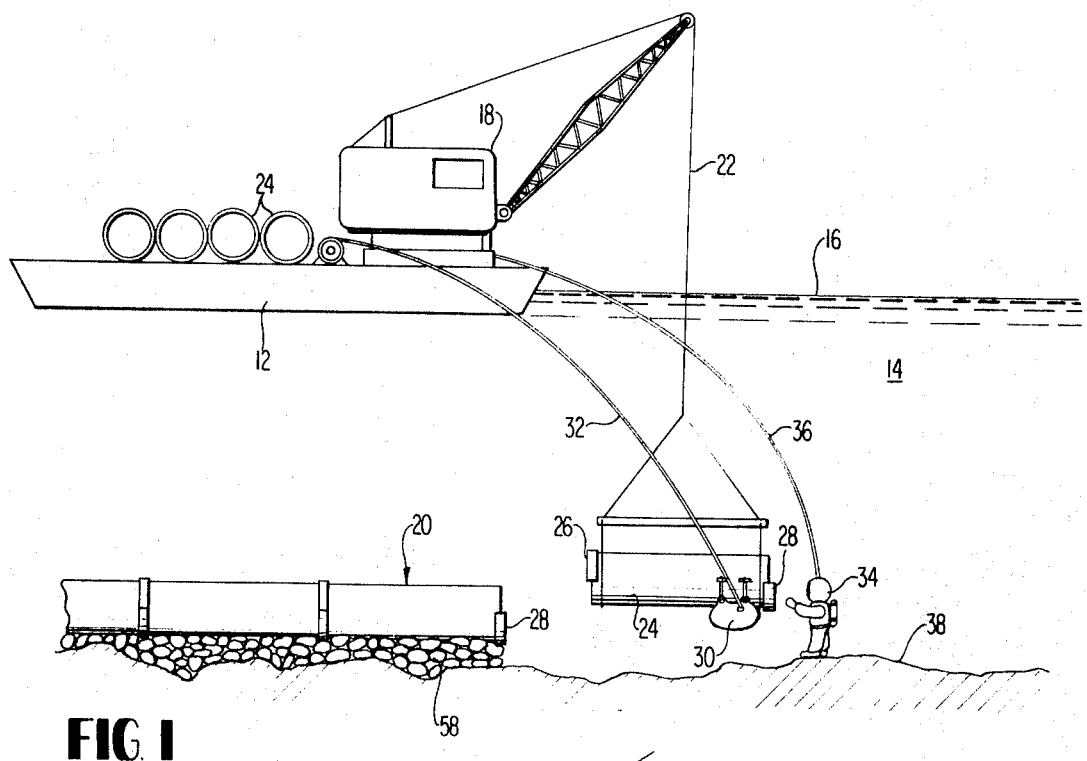
FIG. 1 is an elevational view of a subterranean pipe laying operation illustrating a first step in the method according to the invention.

Referring now to the drawings, there is shown a floating platform or barge 12 on a body of water 14 having a water level 16. A crane 18 on the barge has a cable 22 for lowering and positioning pipe sections 24 on a lake floor or bottom 38 for assembly to pipeline section 20. Each pipe section 24 has an upper mating section 26 at one end and a lower mating section 28 at the outer end. An inflatable bag 30 having a fluid pressure line 32 is secured to the outer end of each pipe section through eye containing flanges 42 and straps 44. Each bag has tabs 46 with holes to receive the straps 44. Each bag has a check valve coupling 40 through which it engages the fluid pressure line 32. The check valve can comprise a conventional tire or inner tube valve assembly and the lower end of the pressure line can contain a deactivator for the check valve when the pressure line engages the check valve. A diver 34 having a control line 36 aids in the proper positioning of the pipe sections 24 in the pipeline.

Figure 5:
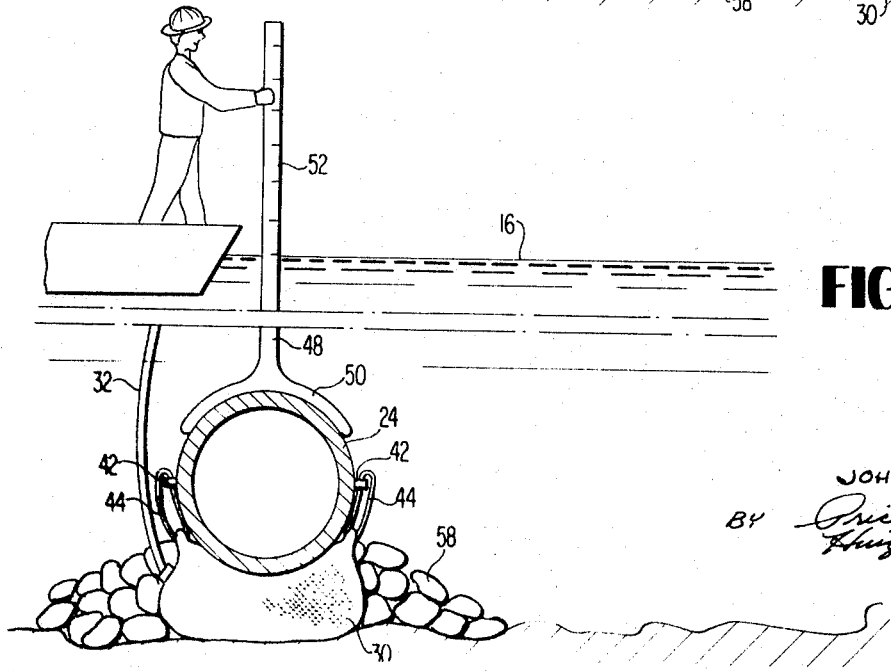
FIG. 5 is a view seen along lines V—V of FIG. 4.

A grade pole 48 having diverging curvilinear legs 50 conforming to the outer circumference of the pipe extends from the top of the pipe to a position above the water and has markings 52 at the upper portion thereof for assisting in the aligning of the pipe section 24 at the predetermined line and grade. For this purpose a predetermined mark on the grade pole 48 is brought in line with the surface of the water, which is used as a reference point in determining the proper pipe elevation. The grade pole 52 can be held in place on top of the pipe section 24 by a worker above the surface of the water on a barge or a floating platform as illustrated in FIG. 5.

Backfill material 58 is positioned beneath the pipes after the pipe has been positioned on line and grade.

THE METHOD STEPS

Figure 2:
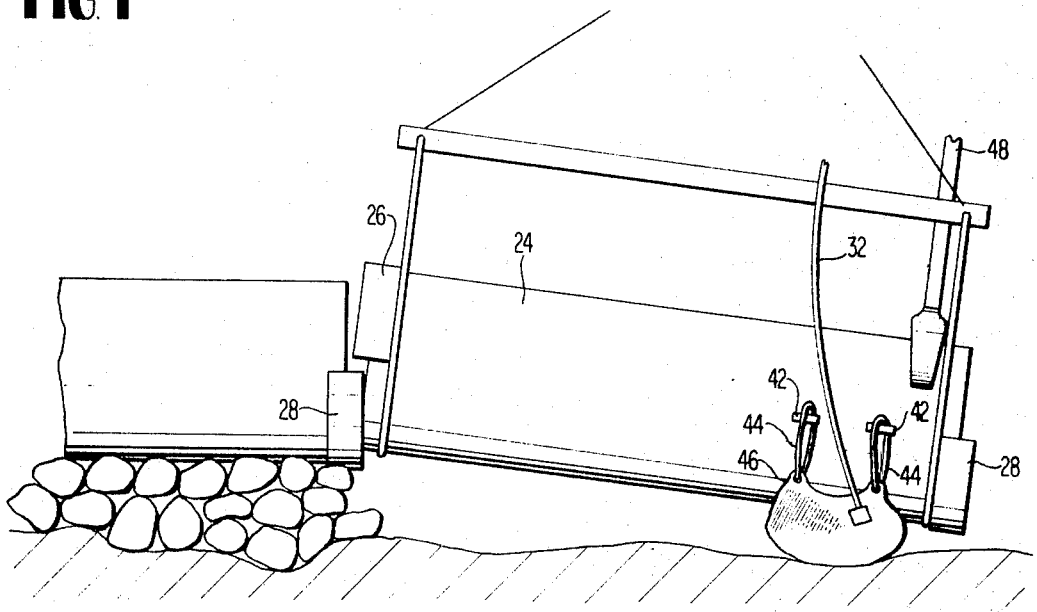
FIG. 2 is an enlarged partial view of the pipe laying operation of FIG. 1 illustrating a second step in the pipe laying method.

With the pipe sections still on the barge 12, the bags 30 are fixed to the eyelet flanges 42. A fluid pressure line 32 is then coupled to the bag through the check valve coupling 40. A cable 22 is then secured around the pipe section 24 in any suitable manner and the pipe section 24 is then lowered to the bottom of the water by the crane 18 (FIG. 1). The diver 34 instructs an operator on the barge 12 as to the manipulation of the crane 18 in order to properly move the pipe into the position illustrated in FIG. 2. The bag 30 is at this point partially inflated. The pipe section 24 is then moved laterally by the crane until the joint can be made. The alignment can be done with the aid of a transit which has been set along the predetermined line or with the use of a laser beam which is set to project along the predetermined line above the water. Frequently, the diver 34 will assist in the alignment in accordance with signals from the barge.

Once the pipe section 24 is on line, the free end of the pipe is set down onto the bottom 38 of the body of water so that the inflatable bag supports the free end of the pipe section 24. At this point, the cable 32 can be removed from the pipe section 24. It is then necessary to raise the pipe section 24 until it is on the predetermined grade. Conventionally, the free end of the pipe was raised with the crane until the proper grade was sighted on the grade rod. In the process, movement of the barge would result in movement of the pipe from its aligned position before backfilling could take place.

Figure 3:
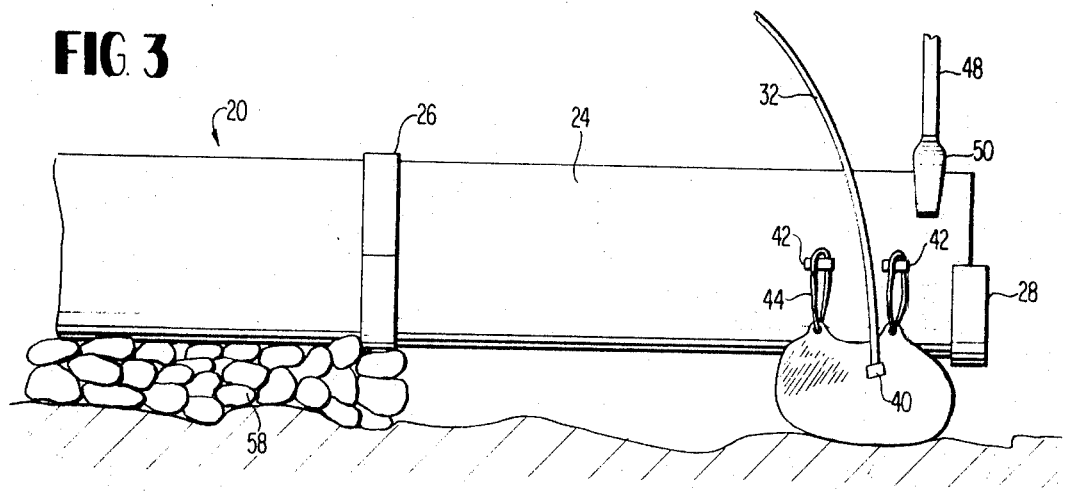
FIG. 3 is a view similar to FIG. 2 illustrating a third step in the pipe assembly method.

According to the invention, fluid pressure is supplied to bag 30 through the fluid pressure line 32, thereby raising the outer end of the pipe section 24. Consequently, the grade pole 48 placed in engagement therewith will also be raised. This step is illustrated in FIG. 3. The desired distance between the top of the pipe section 24 and the level of the water is calculated according to the desired axis of the pipeline. The calibrated top of the grade pole 48 is then determined in relation to the water surface. The sighting of the grade rod is illustrated in FIG. 5. When the rod 52 has raised to such an extent that the proper distance is obtained on the grade pole 48, the pumping of fluid pressure to bag 30 is then stopped.

Alternately, in the event that the outer end of pipe section 24 is too high, the fluid pressure can be drained from bag 30 through line 32 until the outer end of the pipe section 24 is at the proper grade. To this end, suitable pumps and valves (not shown) can be provided on the barge 12 at the upper end of the fluid pressure line 32.

Figure 4:
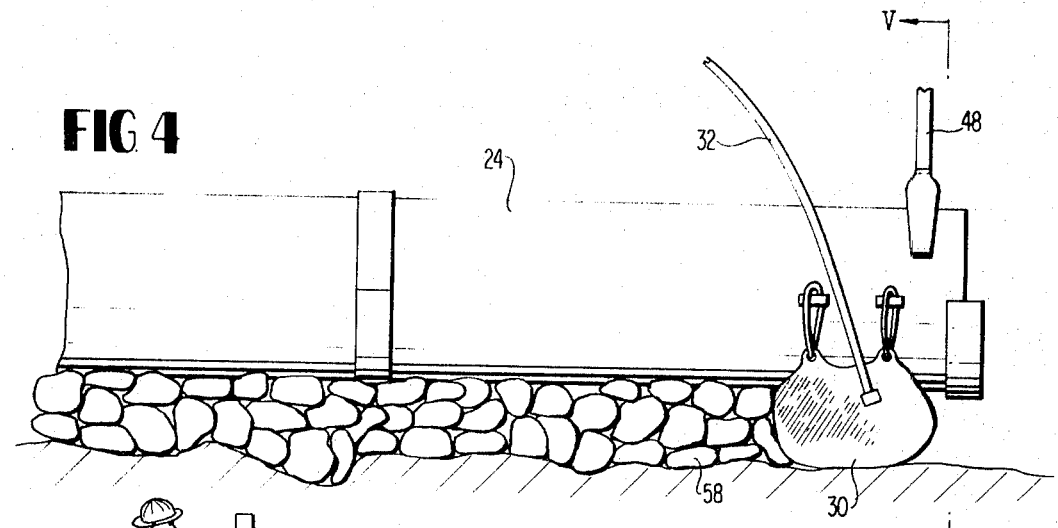
FIG 4 is a view similar to FIGS. 2 and 3 and illustrating a fourth step in the method.

As shown in FIG. 4, backfill material 58 is then pushed beneath and around the bottom of the pipe section 24 to fix it in place. The fluid pressure line 32 is then disconnected from the bag 30. The check valve coupling 40 is such that the fluid pressure will remain within the bag 30 when the hose 32 is disconnected. However, the coupling is such as to permit the fluid to pass into or out of the bag through line 32 when the line 32 is connected thereto.

The bags 30 can then be removed from the end of the pipe section 24, or alternately, they can be left in place on the pipes with the fluid pressure in them to assure stability of the pipe sections 24.

After aligning of the pipe sections, the joints therebetween can be sealed by conventional methods.

It will be appreciated from the foregoing that once the pipe section is positioned on line, it is securely resting on the bottom of the lake and is raised to proper grade while maintaining contact with the lake bottom. Thus, no matter what movement is imparted to the barge, the pipe section will not move off line.

The bags can be made of any suitable flexible and strong material. For example, rubber or plastic material suitably reinforced with glass or other fibers can be used. An example of one such material is nylon, single ply, heavy rubberized fabric.

Any type of fluid pressure can be used to inflate the bags 30. In most cases, compressed air will be injected into the bags. Its buoyancy helps lift the pipe section. In some circumstances, water or other fluids can be pumped into the bags.

Various means can be used to secure the bags to the pipe sections. For example, the eyelet flanges illustrated in the drawings can be welded onto corrugated steel pipe. Alternately, as in the case of iron pipe, or plastic pipe, the straps 44 can be wrapped around the pipe section. Other suitable fastening means will be suggested to those skilled in the art.

Various methods can be used for ascertaining the alignment of the pipe sections on line and grade. For example, conventional sounding devices can be used in water which is too deep for the grade pole 48.

The invention has been described with reference to a method and apparatus for laying a subaqueous pipeline. This area finds the greatest applicability for my invention. However, it is conceivable that within the broader aspects of the concept to use the method and apparatus in the laying of above ground cross-country pipeline as well as conventional sewer lines.

Reasonable variation and modification are possible within the scope of the foregoing disclosure, the drawings and the appended claims without departing from the spirit of the invention which is intended to be limited only by the appended claims and the reasonable equivalents thereto.

The embodiments of the invention in which an exclusive property or privilege is claimed are defined as follows:

1. A method for laying a subaqueous pipeline along a predetermined axis, said method comprising: positioning a first pipe section on the floor of an aqueous body in the course for the pipeline with an inflatable bag means beneath at least one end portion thereof; adjusting the fluid pressure in said inflatable bag means until said one end is aligned with said predetermined axis; and continuing to lay successive pipe sections seriatim by positioning each pipe section with one end in registry with the free end of each previous pipe section and aligning the other end of each of said successive pipe sections in the manner described for said first pipe section.

2. A method for laying a subaqueous pipeline according to claim 1 wherein said inflatable bag means is first coupled to each of said pipe sections before each of said pipe sections is lowered into the water.

3. A method for laying a subaqueous pipeline according to claim 2 wherein said inflatable bag means are removed from beneath each of said pipe sections after each of said pipe sections is fixed in place.

4. A method for laying a subaqueous pipeline according to claim 1 wherein said inflatable bag means are substantially deflated and said adjusting step comprises forcing fluid pressure into each of said inflatable bag means until said end of the pipe section is properly aligned with said predetermined axis.

5. A method for laying a subaqueous pipeline according to claim 1 wherein the fluid in said inflatable bag means is air.

6. A method for laying a subaqueous pipeline according to claim 1 wherein said fluid in said inflatable bag means is water.

7. A method for laying a subaqueous pipeline according to claim 1 wherein the fluid pressure in said inflatable bag means is controlled from above the level of water of said aqueous body.

8. A method for laying a pipeline along a predetermined axis, said method comprising: positioning a first pipe section in the course for said pipeline with an inflatable bag at one end thereof; adjusting the fluid pressure in said inflatable bag until said one end is aligned with said predetermined axis; and continuing to lay successive pipe sections seriatim by positioning each pipe section with one end in registry with the free end of each previous pipe section and aligning the other end of each of said successive pipe sections in the manner described for said first pipe section.

9. A method for laying a pipeline according to claim 8 wherein said inflatable bag is first coupled to each of said pipe sections before each of said pipe sections is positioned in the course for said pipeline.

10. In combination, a conduit section of tubular shape and of predetermined length, and an inflatable fluid tight bag on said conduit section, said bag fitting around a lower portion of the circumference of said conduit section, an opening in said bag for admitting fluid pressure to and removing fluid pressure from said bag, and check valve means in said opening to retain the pressure within said bag.

11. The combination of claim 10 wherein said bag is on an end portion of said conduit section.

12. The combination of claim 10 wherein said bags are releasable from said conduit sections.

13. Apparatus for laying a subaqueous pipeline comprising: means for supporting pipe sections above a body of water; means for lowering each pipe section into the water and to place said pipe sections in preselected positions on the bottom of said aqueous body; inflatable bag means beneath one end portion of each pipe section; a fluid pressure line releasably coupled to a bag on one such pipe section at the bottom of said aqueous body; and means coupled to said fluid pressure line for adjusting the fluid pressure in said inflatable bag means so as to raise or lower one end of said pipe section on said bottom of said aqueous body.

* * * * *